(12) United States Patent
Mizoguchi

(10) Patent No.: US 9,860,499 B2
(45) Date of Patent: Jan. 2, 2018

(54) IMAGE DISPLAY APPARATUS

(71) Applicant: Seiko Epson Corporation, Tokyo (JP)

(72) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/010,176

(22) Filed: Jan. 29, 2016

(65) Prior Publication Data

US 2016/0227177 A1 Aug. 4, 2016

(30) Foreign Application Priority Data

Jan. 30, 2015 (JP) ................................. 2015-017658

(51) Int. Cl.
*G02B 26/08* (2006.01)
*G03B 21/14* (2006.01)
(Continued)

(52) U.S. Cl.
CPC ......... *H04N 9/317* (2013.01); *G02B 19/0014* (2013.01); *G02B 19/0066* (2013.01); *G02B 27/0905* (2013.01); *G02B 27/0922* (2013.01); *G02B 27/1026* (2013.01); *G02B 27/1053* (2013.01); *G02B 27/149* (2013.01); *G03B 21/005* (2013.01); *G03B 21/142* (2013.01); *H04N 9/3105* (2013.01); *H04N 9/3141* (2013.01); *H04N 9/3188* (2013.01); *G02B 26/0875* (2013.01); *G03B 21/147* (2013.01)

(58) Field of Classification Search
CPC .. G02B 26/0875; G03B 21/142; G03B 21/14; G03B 21/147; G03B 21/005; G03B 21/006; G03B 21/008; H04N 9/3105; H04N 9/3141; H04N 9/3111; H04N 9/317; H04N 9/3188
See application file for complete search history.

(56) References Cited

U.S. PATENT DOCUMENTS

2005/0001985 A1* 1/2005 Kitabayashi ........... G03B 21/16 353/31
2005/0140934 A1* 6/2005 Seo ....................... G03B 21/005 353/46
(Continued)

FOREIGN PATENT DOCUMENTS

JP 2011-203460 A 10/2011

OTHER PUBLICATIONS

Extended European Search Report for EP Application No. 16153127.2, dated Jun. 29, 2016. (11 pages).

*Primary Examiner* — Ryan Howard
(74) *Attorney, Agent, or Firm* — Harness, Dickey & Pierce, P.L.C.

(57) ABSTRACT

A projector includes a light source, liquid crystal panels that modulate light emitted from the light source, a dichroic prism that combines modulated light fluxes modulated by the liquid crystal panels with one another into video light and outputs the video light, and a pixel shift device that changes the optical path of the video light output from the dichroic prism. The pixel shift device includes a glass plate on which the video light is incident and an electromagnetic actuator that causes the glass plate to swing. The electromagnetic actuator is arranged in a position outside the dichroic prism and different from the positions of the liquid crystal panels when viewed along the optical axis of the video light.

9 Claims, 13 Drawing Sheets

(51) Int. Cl.
*H04N 9/31* (2006.01)
*G02B 27/14* (2006.01)
*G02B 19/00* (2006.01)
*G02B 27/09* (2006.01)
*G02B 27/10* (2006.01)
*G03B 21/00* (2006.01)

(56) References Cited

U.S. PATENT DOCUMENTS

| | | |
|---|---|---|
| 2005/0264547 A1* | 12/2005 | Choi ................. H04N 9/317 345/204 |
| 2006/0007057 A1 | 1/2006 | Choi et al. |
| 2006/0158046 A1 | 7/2006 | Barnes |
| 2011/0234650 A1 | 9/2011 | Watanabe |
| 2013/0002971 A1* | 1/2013 | Kadotani ............ G02B 27/102 349/5 |
| 2014/0036239 A1 | 2/2014 | Mashitani |

\* cited by examiner

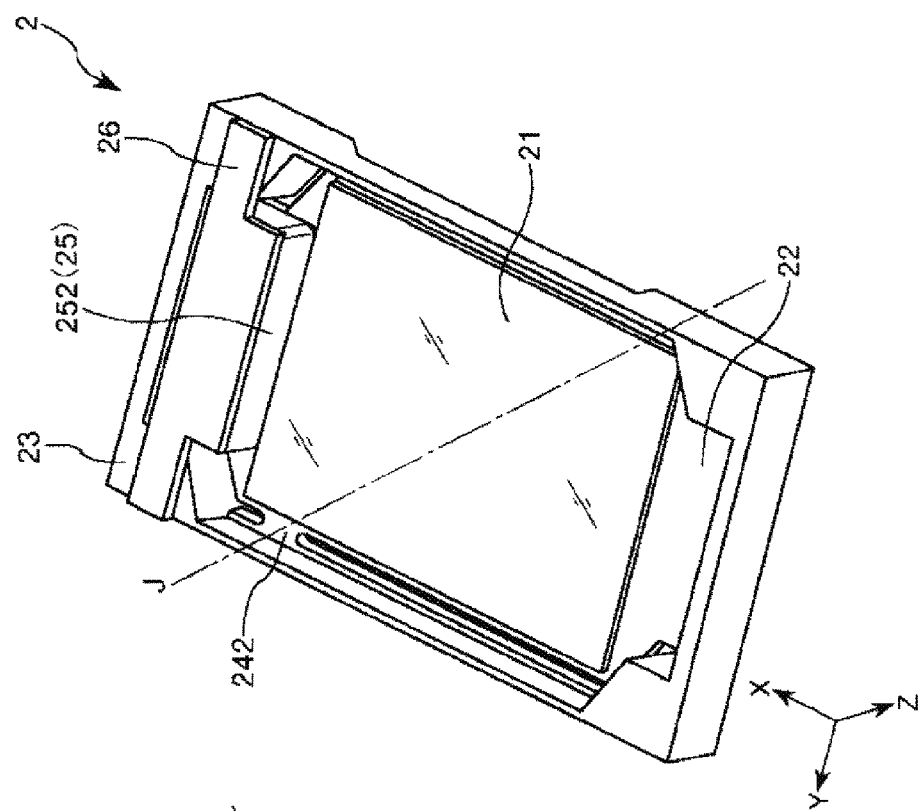
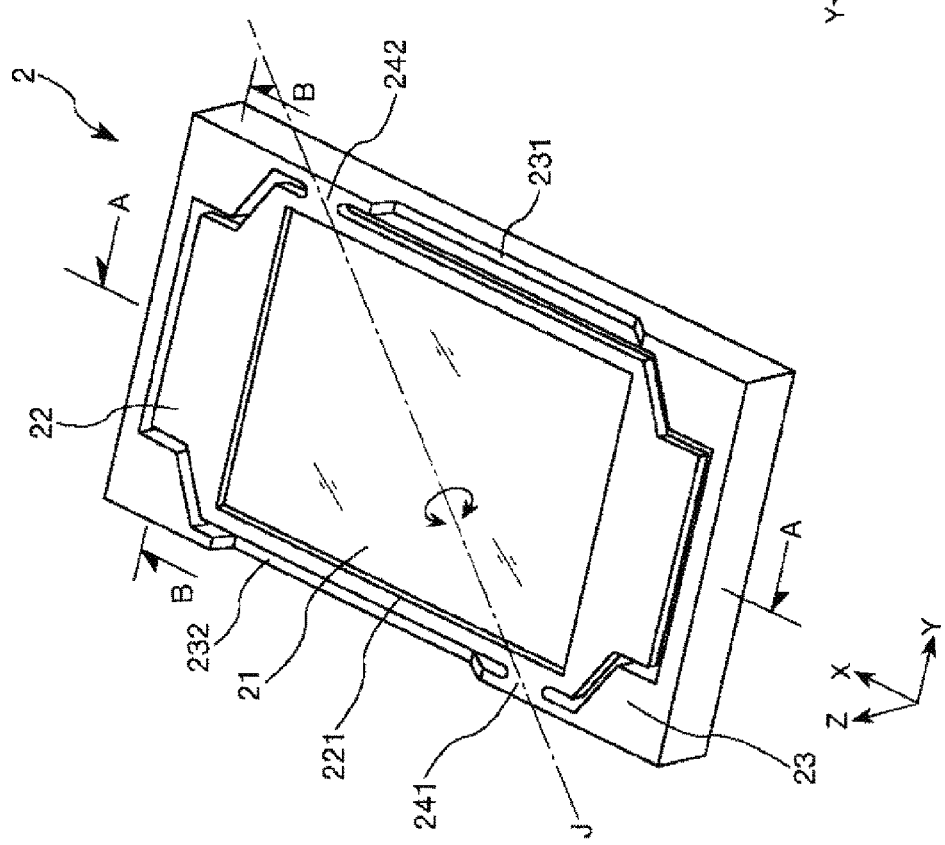
FIG. 3A
FIG. 3B

IMAGE DISPLAY APPARATUS

BACKGROUND

1. Technical Field

The present invention relates to an image display apparatus.

2. Related Art

In some projectors, a technique for shifting the axis of video light from a light modulator such as a liquid crystal panel has been used to make the resolution of a projected image higher than the resolution of the light modulator. For example, the projector described in JP-A-2011-203460 includes a dichroic prism that combines R, G, and B modulated light fluxes modulated by three liquid crystal panels with one another and a projection lens system that projects the video light having exited out of the dichroic prism on a screen, and an optical path control unit (wobbling device) for shifting the optical axis of the video light is disposed between the dichroic prism and the projection lens system.

The optical path control unit described in JP-A-2011-203460 is configured to change the attitude of a light transmitting plate in a predetermined cycle. As an actuator for changing the attitude of the light transmitting plate, it is conceivable to use, for example, an electromagnetic actuator using a coil and a permanent magnet.

When an electromagnetic actuator is used as the actuator for changing the attitude of the light transmitting plate, however, the electromagnetic force acting between the electromagnetic actuator and each of the liquid crystal panels (including the support that supports liquid crystal panel) lowers the precision with which the optical path control unit is driven. As such, image display characteristics of the image display apparatus may be undesirably degraded.

SUMMARY

An advantage of some aspects of the invention is to provide an image display apparatus capable of increasing the precision with which an optical path control unit is driven to provide excellent image display characteristics.

The advantage can be achieved by the invention embodied as follows.

An image display apparatus according to an aspect of the invention includes a light source that emits light, a first spatial light modulator and a second spatial light modulator that modulate the light emitted from the light source, a light combining element that combines first modulated light modulated by the first spatial light modulator and second modulated light modulated by the second spatial light modulator with each other into combined light and outputs the combined light, and an optical path control unit (controller) capable of changing an optical path of the combined light outputted from the light combining element. The optical path control unit includes an optical section having a light incident surface on which the combined light is incident and an electromagnetic actuator that displaces the optical section, and the electromagnetic actuator is arranged in a position outside the light combining element and different from positions of the first spatial light modulator and the second spatial light modulator when viewed along the optical axis of the combined light outputted from the light combining element.

This aspect of the invention can provide an image display apparatus capable of increasing the precision with which the optical path control unit is driven to provide excellent image display characteristics.

In the image display apparatus according to the aspect of the invention, it is preferable that the electromagnetic actuator is arranged in a position rotated from a position the first spatial light modulator around the optical axis of the combined light by an angle greater than or equal to 45° but smaller than or equal to 135° when viewed along the optical axis of the combined light outputted from the light combining element.

The configuration described above allows a greater increase in the precision with which the optical path control unit is driven and hence provides more excellent image display characteristics.

In the image display apparatus according to the aspect of the invention, it is preferable that the light combining element has a first light incident surface on which the first modulated light is incident, a second light incident surface on which the second modulated light is incident, and a light exiting surface through which the combined light exits, and that the electromagnetic actuator is arranged in a position outside a surface other than the first light incident surface when viewed along the optical axis of the combined light outputted from the light combining element.

The configuration described above allows a greater increase in the precision with which the optical path control unit is driven and hence provides more excellent image display characteristics.

It is preferable that the image display apparatus according to the aspect of the invention further includes a third spatial light modulator that modulates the light emitted from the light source, and the light combining element has a third light incident surface which is disposed so as to face the first light incident surface and on which third modulated light modulated by the third spatial light modulator is incident, and the electromagnetic actuator is disposed in a position outside a surface other than the first light incident surface and the third light incident surface when viewed along the optical axis of the combined light outputted from the light combining element.

The configuration described above allows three-color modulated light fluxes, for example, red (R), green (G), and blue (B) light fluxes, to be combined with one another and hence full-color video light to be output.

In the image display apparatus according to the aspect of the invention, it is preferable that a direction in which the first light incident surface and the third light incident surface are arranged differs from a direction in which the optical section and the electromagnetic actuator are arranged when viewed along the optical axis of the combined light outputted from the light combining element.

The configuration described above allows a greater increase in the precision with which the optical path control unit is driven and hence provides more excellent image display characteristics.

In the image display apparatus according to the aspect of the invention, it is preferable that the light combining element is a dichroic prism.

The light combining element can therefore be simply configured.

In the image display apparatus according to the aspect of the invention, it is preferable that the optical path control unit includes the optical section, a movable section that supports the optical section, a shaft that supports the movable section swingably around a swing axis, and a support that supports the shaft, and the electromagnetic actuator includes a permanent magnet provided in the movable section, and a coil that is disposed so as to face the permanent magnet via the movable section and produces a magnetic field acting on the permanent magnet.

The optical path control unit can therefore be simply configured.

In the image display apparatus according to the aspect of the invention, it is preferable that the support has a recess that opens through a surface facing the light combining element or a surface facing away from the light combining element.

The space in which the optical path control unit is disposed can therefore be reduced.

In the image display apparatus according to the aspect of the invention, it is preferable that the first spatial light modulator is held by a holding section having magnetism.

The electromagnetic actuator and the holding section can therefore be separated from each other with the distance therebetween maximized, whereby the amount of effect of the magnetic field produced by the electromagnetic actuator on the holding section can be reduced.

BRIEF DESCRIPTION OF THE DRAWINGS

Embodiments of the invention will be described with reference to the accompanying drawings, wherein like numbers reference like elements.

FIGS. 3A and 3B are perspective views of an optical path control unit provided in the image display apparatus shown in FIG. 1.

DESCRIPTION OF EXEMPLARY EMBODIMENTS

An image display apparatus according to embodiments of the invention will be described below in detail with reference to the accompanying drawings.

First Embodiment

Figure 1:
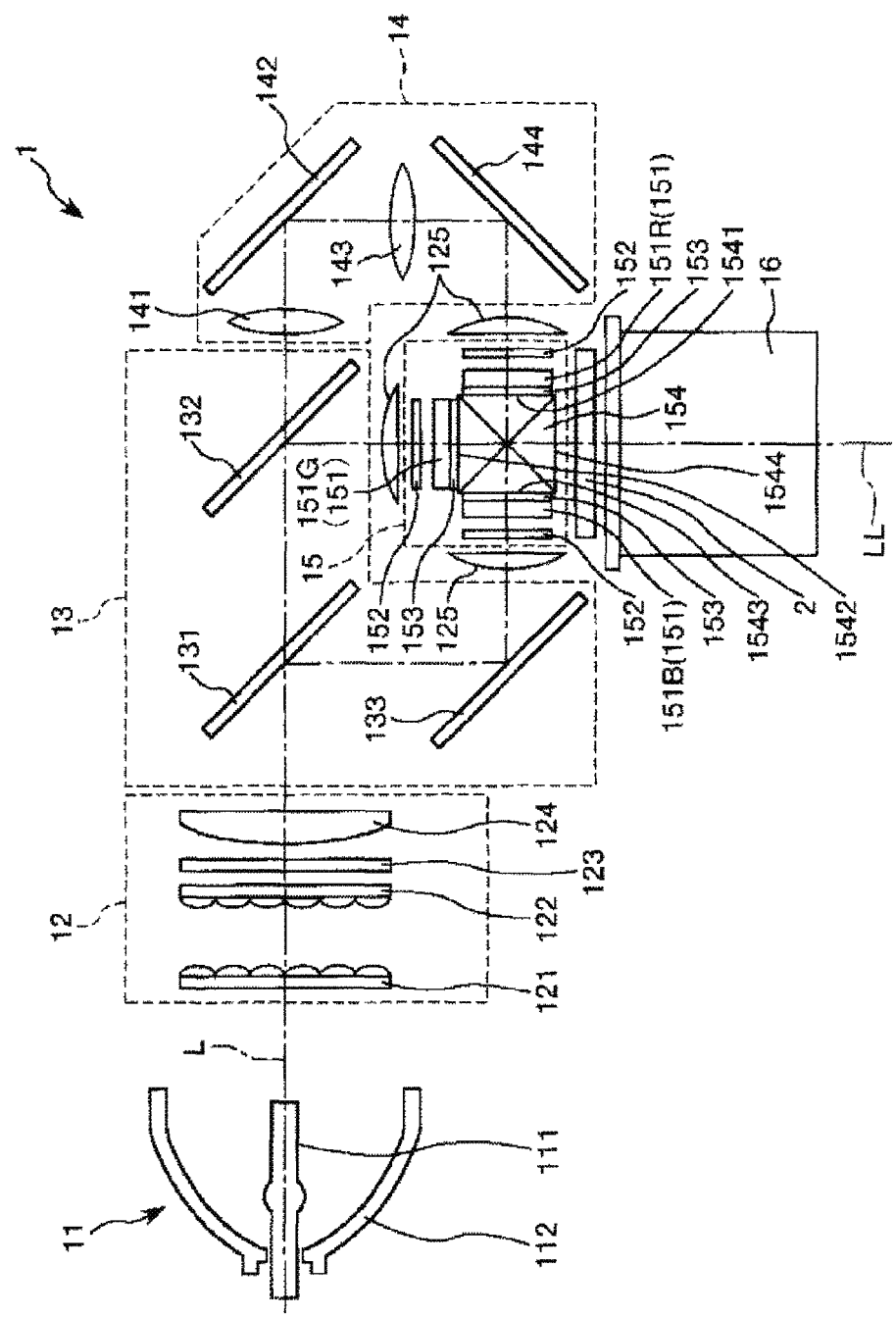
FIG. 1 shows the optical configuration of an image display apparatus according to a first embodiment of the invention.
Figure 2:
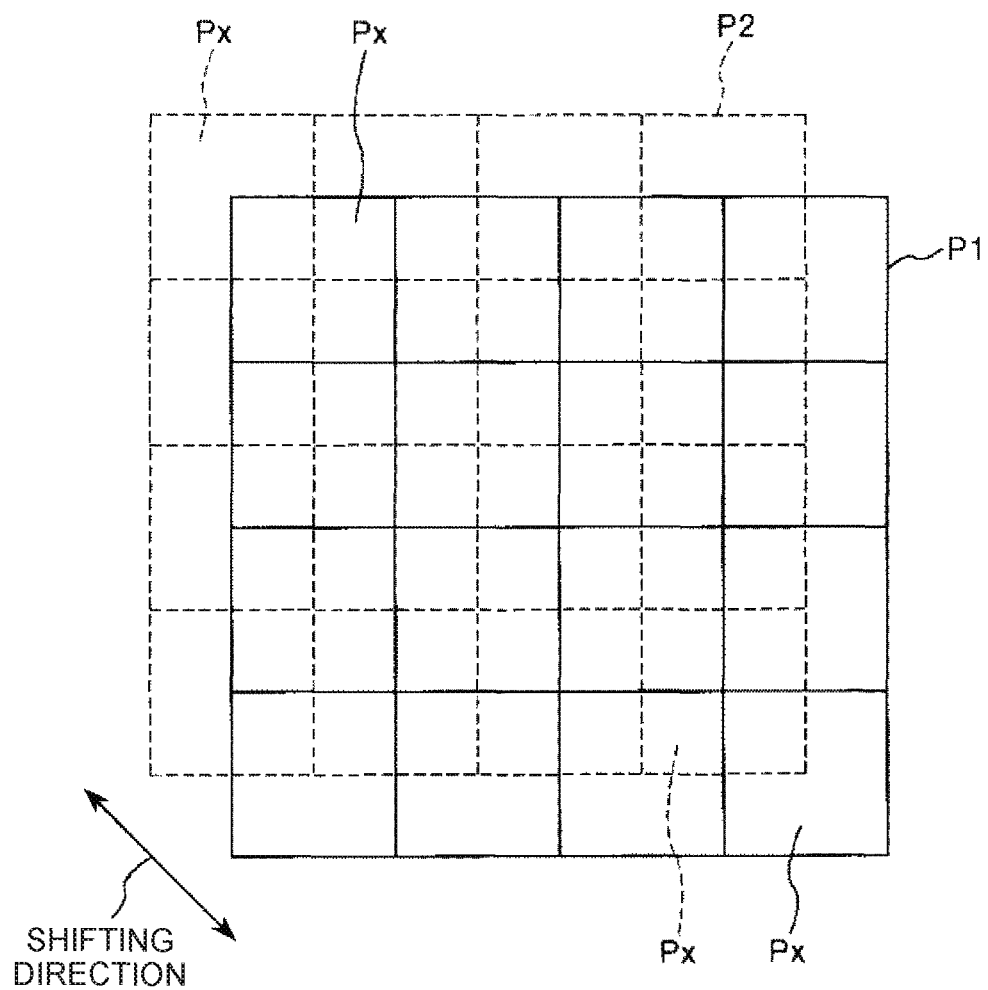
FIG. 2 shows shifted video light.
Figure 4A:
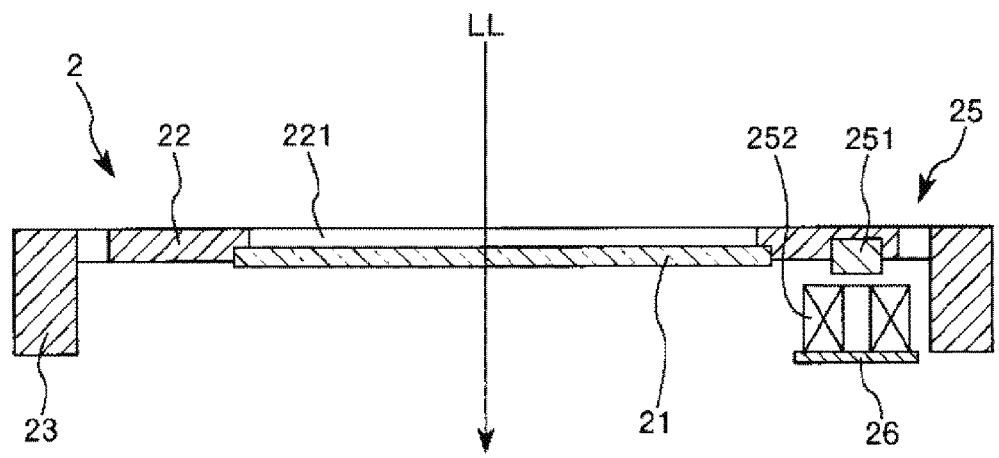
FIGS. 4A and 4B are cross-sectional views taken along the line A-A and the line B-B in FIG. 3A, respectively.
Figure 4B:
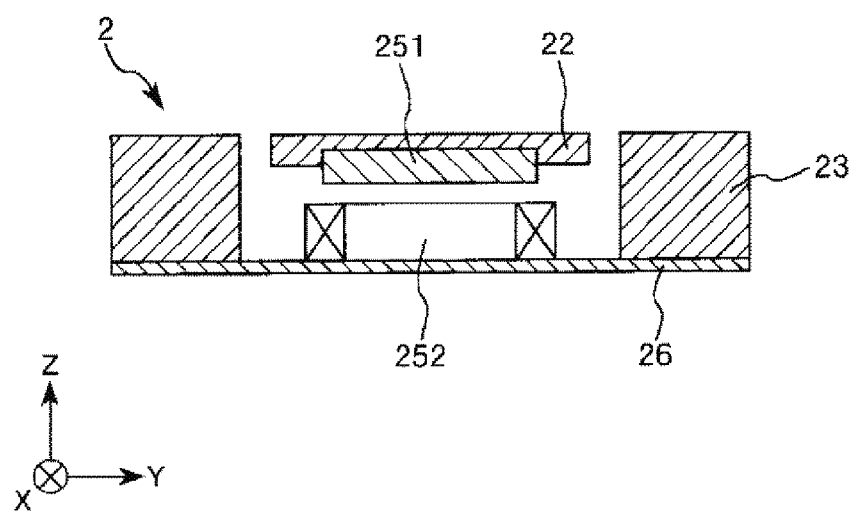
Figure 5B:
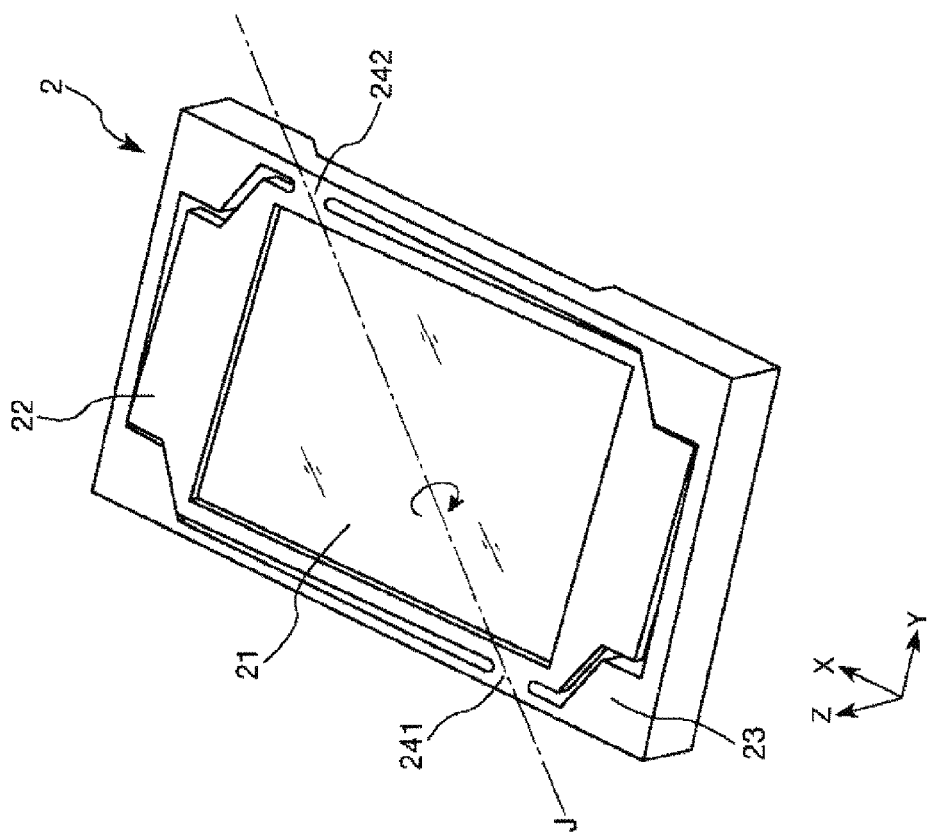
FIGS. 5A and 5B are perspective views showing swing motion of the optical path control unit shown in FIGS. 3A and 3B.
Figure 5A:
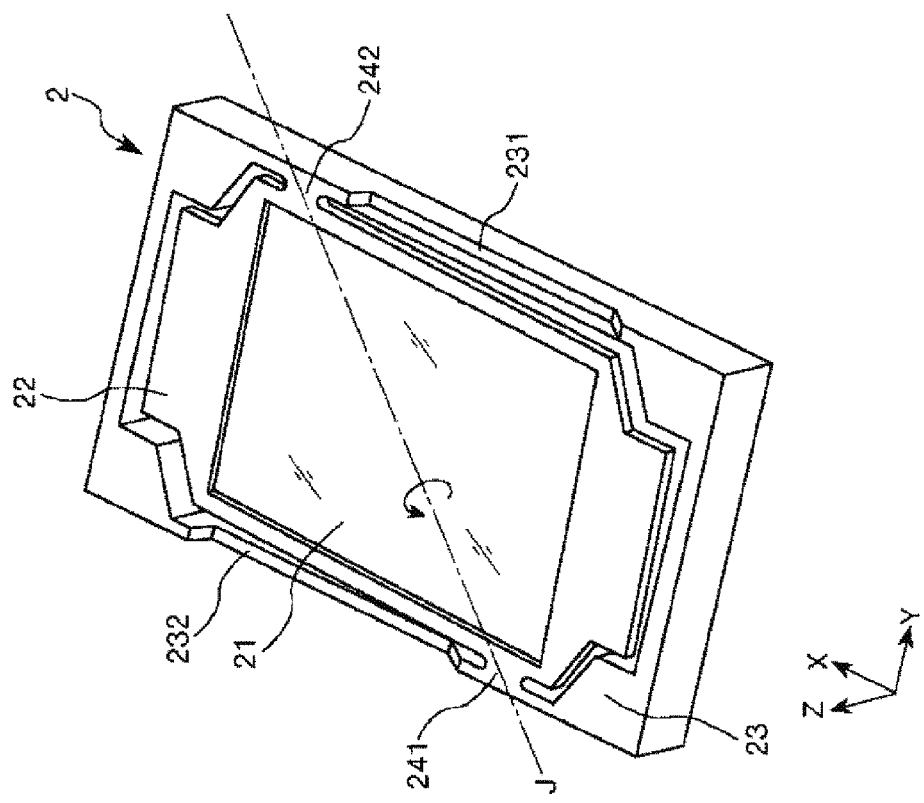
Figure 6:
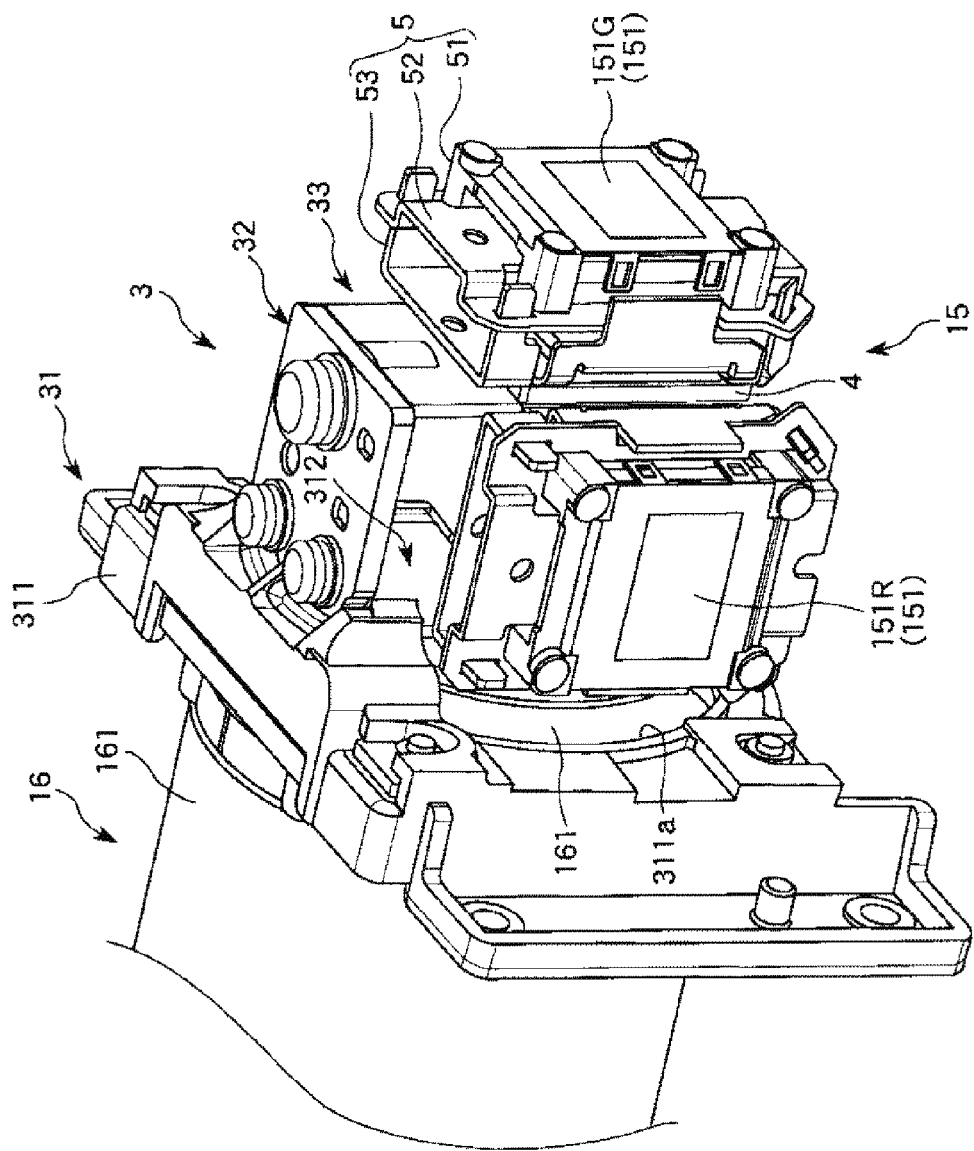
FIG. 6 is a perspective view showing an electro-optical unit and a projection lens fixed to each other.
Figure 7:
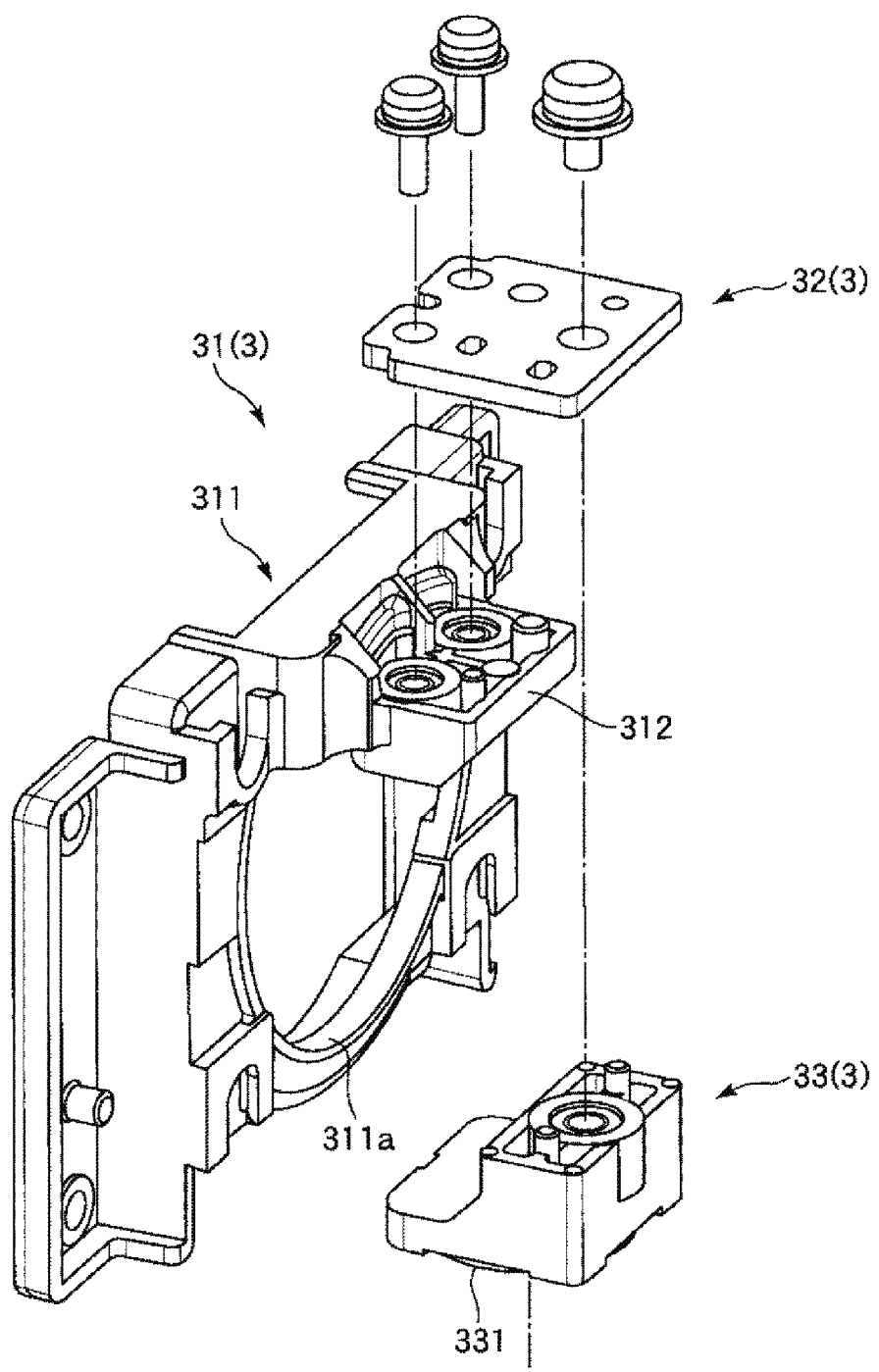
FIG. 7 is an enlarged view of part of FIG. 6.
Figure 8:
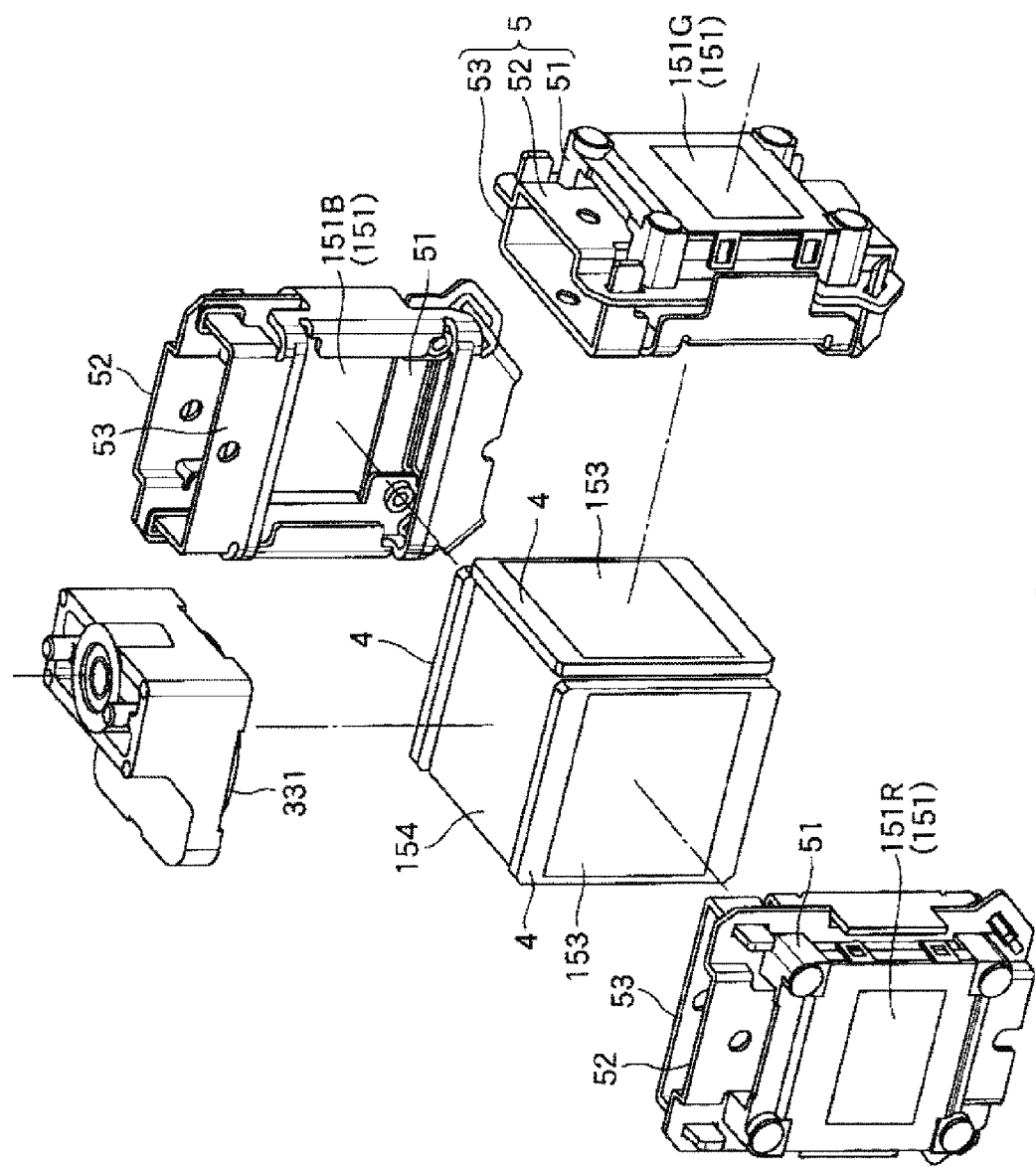
FIG. 8 is another enlarged view of part of FIG. 6.
Figure 9:
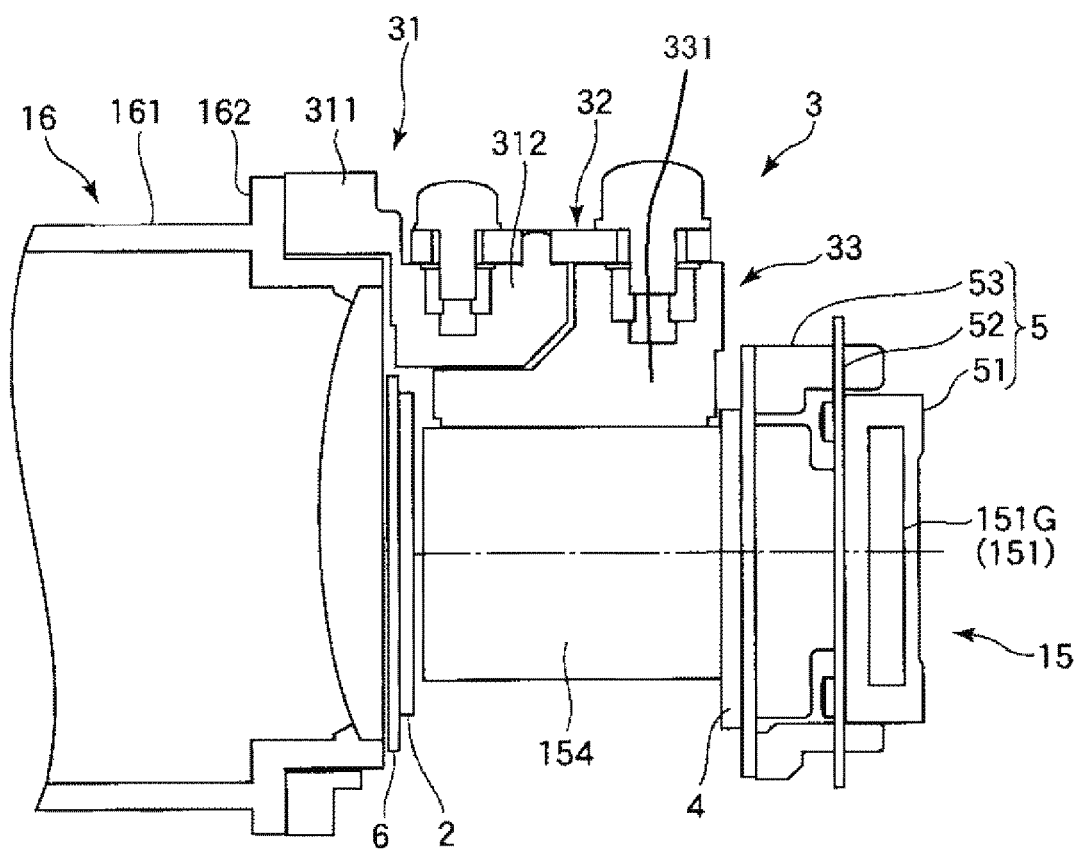
FIG. 9 is a side view showing the electro-optical unit and the projection lens fixed to each other.
Figure 10:
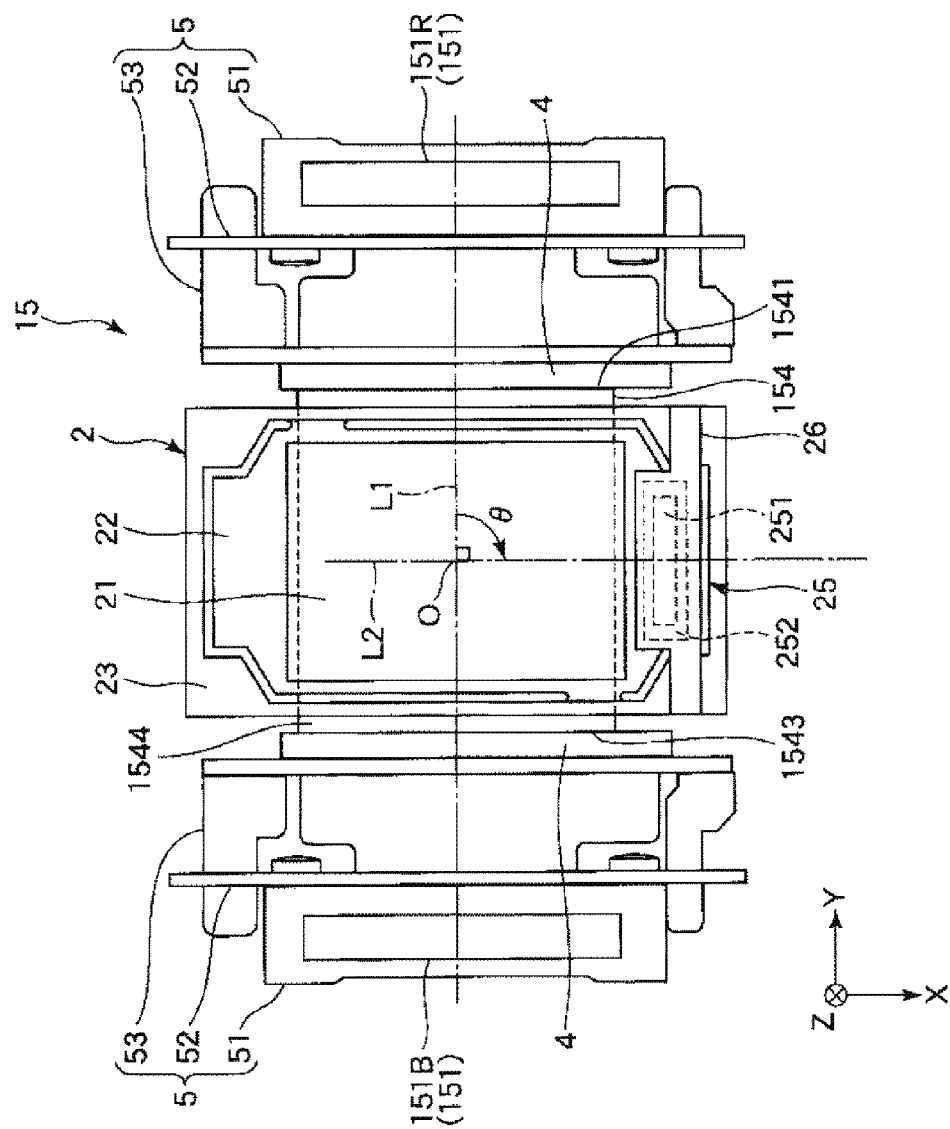
FIG. 10 is a plan view showing the arrangement of the electro-optical unit and the optical path control unit.
Figure 11:
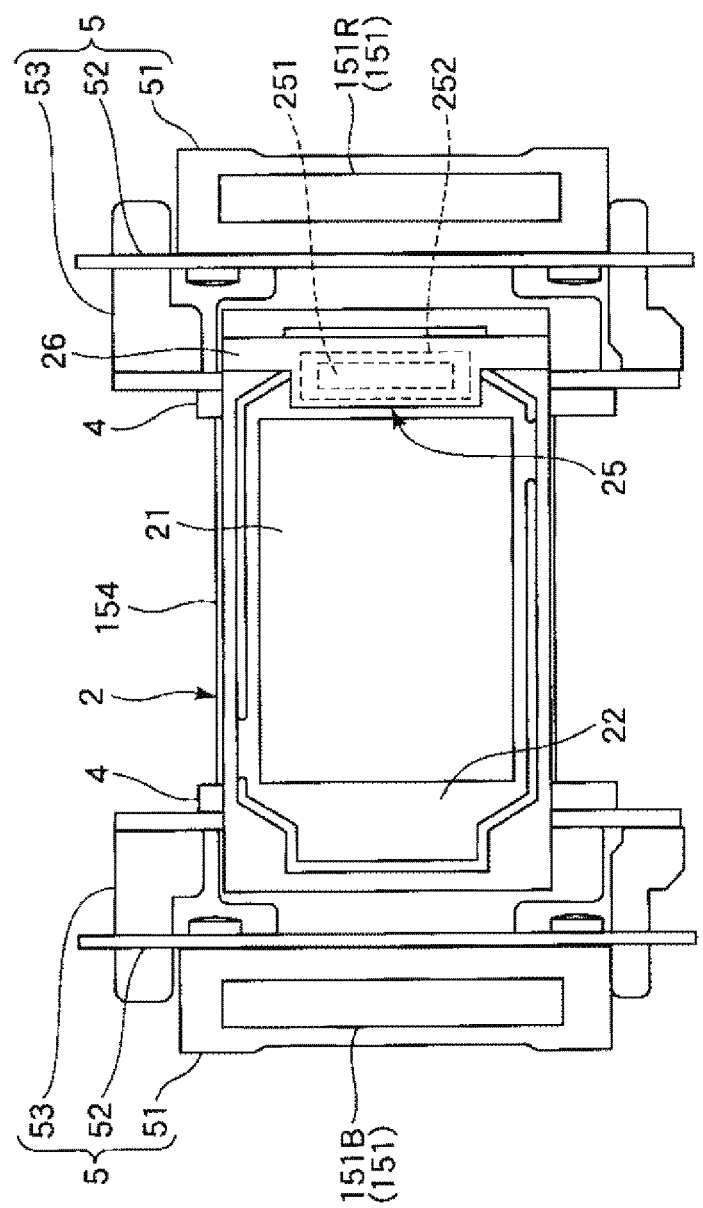
FIG. 11 is another plan view showing the arrangement of the electro-optical unit and the optical path control unit.

FIG. 1 shows the optical configuration of an image display apparatus according to a first embodiment of the invention. FIG. 2 shows shifted video light. FIGS. 3A and 3B are perspective views of an optical path control unit provided in the image display apparatus shown in FIG. 1. FIGS. 4A and 4B are cross-sectional views taken along the line A-A and the line B-B in FIG. 3A, respectively. FIGS. 5A and 5B are perspective views showing swing motion of the optical path control unit shown in FIGS. 3A and 3B. FIG. 6 is a perspective view showing a state in which an electro-optical unit and a projection lens are fixed to each other. FIGS. 7 and 8 are partial enlarged views of FIG. 6. FIG. 9 is a side view showing the state in which the electro-optical unit and the projection lens are fixed to each other. FIGS. 10 and 11 are plan views showing arrangements of the electro-optical unit and the optical path control unit.

FIGS. 3A and 3B to 5A and 5B show an X axis, a Y axis, and a Z axis as three axes perpendicular to one another for ease of description. It is assumed that the front end side of each illustrated arrow is called a "positive (+) side" and the base end side of the arrow is called a "negative (−) side." It is further assumed in the following description that the direction parallel to the X axis is also called an "X-axis direction," the direction parallel to the Y axis is also called a "Y-axis direction," and the direction parallel to the Z axis is also called a "Z-axis direction."

1. Projector

A projector (image display apparatus) 1 shown in FIG. 1 is an LCD-based projector and includes a light source unit 11, an illumination optical unit 12, a color separation optical unit 13, a relay optical unit 14, an electro-optical unit 15, a projection lens 16, and a pixel shift device (optical path control unit) 2, as shown in FIG. 1.

The portions described will be sequentially described below.

Light Source Unit

The light source unit 11 includes a light source 111 and a reflector 112. In the light source unit 11, light rays that form light L emitted from the light source 111 are aligned with one another by the reflector 112 so as to travel in the same direction toward the illumination optical unit 12. The light source 111 in the present embodiment is an ultrahigh-pressure mercury lamp. The light source 111 is not limited to an ultrahigh-pressure mercury lamp and can, for example, be a halogen lamp or a light emitting diode (LED).

Illumination Optical Unit

The illumination optical unit 12 includes a first lens array 121, a second lens array 122, a polarization conversion element 123, a superimposing lens 124, and parallelizing lenses 125. The first lens array 121 is formed of lenslets. Each lenslet has a roughly rectangular contour. The lenslets are arranged in a matrix, and the lenslets divide the light L into sub-light fluxes and output the sub-light fluxes. The second lens array 122 is formed of lenslets arranged in a matrix in correspondence with the sub-light fluxes (light L) having exited out of the lenslets of the first lens array 121. The second lens array 122 causes the sub-light fluxes (light L) having exited out of the first lens array 121 to exit toward the superimposing lens 124.

The polarization conversion element 123 has a function of aligning the sub-light fluxes having exited out of the second lens array 122, which are randomly polarized light fluxes, with one another into substantially one type of polarized light fluxes usable by each liquid crystal panel 151. The sub-light fluxes having exited out of the second lens array 112 and having been converted by the polarization conversion element 123 into substantially one type of polarized light fluxes are roughly superimposed on one another by the superimposing lens 124 on the surface of each liquid crystal panel 151. The light fluxes having exited out of the superimposing lens 124 are parallelized by each of the parallelizing lenses 125 and superimposed on one another on the corresponding liquid crystal panel 151.

Color Separation Optical Unit

The color separation optical unit 13 includes a first dichroic mirror 131, a second dichroic mirror 132, and a reflection mirror 133. The color separation optical unit 13 separates the light fluxes having exited out of the illumination optical unit 12 into three-color light fluxes, red (R) light, green (G) light, and blue (B) light.

Relay Optical Unit

The relay optical unit 14 includes a light-incident-side lens 141, a relay lens 143, and reflection mirrors 142 and 144. The relay optical unit 14 guides the R light separated by the color separation optical unit 13 to a liquid crystal panel 151R for R light.

Electro-Optical Unit

The electro-optical unit 15 includes light-incident-side polarizers 152, the liquid crystal panels 151 (called liquid crystal panel 151R for R light, liquid crystal panel 151G for G light, and liquid crystal panel 151B for B light), light-exiting-side polarizers 153, and a dichroic prism (light combining element) 154. The light-incident-side polarizers 152 and the light-exiting-side polarizers 153 are provided in correspondence with the liquid crystal panels 151R, 151G, and 151B. Each of the liquid crystal panels 151 (151R, 151G, and 151B) is a spatial light modulator that modulates light fluxes separated on a color basis by the color separation optical unit 13 in accordance with an image signal.

The dichroic prism 154 is formed by bonding four rectangular prisms to each other and thus has a roughly square shape in a plan view and a box-like shape as a whole. Two dielectric multilayer films are formed along the interfaces between the bonded rectangular prisms. The thus configured dichroic prism 154 combines the modulated light fluxes modulated by the liquid crystal panels 151R, 151G, and 151B with one another to produce video light (combined light) LL and outputs the video light LL to the projection lens 16. Using the dichroic prism 154 allows the video light LL to be readily produced.

The dichroic prism 154 has a first light incident surface 1541, which is disposed so as to face the liquid crystal panel 151R and on which the modulated light modulated by the liquid crystal panel 151R is incident, a second light incident surface 1542, which is disposed so as to face the liquid crystal panel 151G and on which the modulated light modulated by the liquid crystal panel 151G is incident, a third light incident surface 1543, which is disposed so as to face the liquid crystal panel 151B and on which the modulated light modulated by the liquid crystal panel 151B is incident, and a light exiting surface 1544, through which the video light LL exits. The first light incident surface 1541 and the third light incident surface 1543 are disposed so as to face each other (on opposite sides of dichroic prism 154), and the second light incident surface 1542 and the light exiting surface 1544 are disposed so as to face each other (on opposite sides of dichroic prism 154).

Projection Lens

The projection lens 16 is configured as a lens unit that is a combination of a plurality of lenses, enlarges the video light LL produced by the electro-optical unit 15 at a desired magnification, and projects a color still image or color motion images on the screen.

Pixel Shift Device

The pixel shift device 2 is disposed between the light exiting surface 1544 of the dichroic prism 154 and the projection lens 16 and is capable of shifting the optical axis of the video light LL having exited out of the dichroic prism 154. The optical axis shift allows an image having resolution (4K in a case where liquid crystal panels 151 support full high-definition level) higher than the resolution of the liquid crystal panels 151 to be projected on the screen.

The principle of the increase in resolution will be briefly described with reference to FIG. 2. The pixel shift device 2 has a glass plate 21, which transmits the video light LL, and changing the attitude of the glass plate 21 allows the optical axis of the video light LL to be shifted based on refraction. The projector 1 uses the shift of the optical axis to increase the resolution of an image projected on the screen. That is, an image display position P1 in a case where the optical axis of the video light LL is shifted toward one side and an image display position P2 in a case where the optical axis of the video light LL is shifted toward the other side are shifted from each other by half a pixel in an oblique direction on the screen (direction indicated by the arrow in FIG. 2); and images are displayed alternately in the image display positions P1 and P2 to increase the apparent number of pixels. The amount of shift between the image display positions P1 and P2 is not limited to one-half a pixel and may instead, for example, be one-fourth or three-fourths of a pixel Px.

The pixel shift device 2 includes a movable section 22, which is provided with a glass plate (optical section) 21, which has light transmissivity and deflects the video light LL, a frame-shaped support 23, which is provided around the movable section 22, shafts 241 and 242, which connect the movable section 22 to the support 23 and swingably (pivotably) support the movable section 22 around a swing axis J relative to the support 23, and an electromagnetic actuator 25, which causes the movable section 22 to swing relative to the support 23, as shown in FIGS. 3A and 3B. The thus configured pixel shift device 2 can readily perform the pixel shift.

The pixel shift device 2 is disposed so that the +Z side thereof (the side facing permanent magnet 251) faces the dichroic prism 154 and the −Z side thereof (the side facing coil) faces the projection lens 16. The orientation of the pixel shift device 2 may instead be reversed.

The movable section 22 has a flat-plate-like shape. A through hole 221 is formed in a central portion of the movable section 22, and the glass plate 21 is fit into the through hole 221. The through hole 221 has a step in the inner circumferential surface, and the step receives the glass plate 21. The glass plate 21 fit into the thus formed through hole 221 is fixed to the movable section 22, for example, with an adhesive.

The glass plate 21 has a rectangular shape in a plan view. Further, the glass plate 21 is disposed so as to face the dichroic prism 154. The thus configured glass plate 21 can refract the video light LL incident thereon, when the angle of incidence of the video light LL deviates from 0°, and transmit the refracted light. The direction of the deflected video light LL and the amount of deflection can therefore be controlled by changing the attitude of the glass plate 21 in such a way that a target angle of incidence is achieved. The size of the glass plate 21 is set as desired to allow the entire video light LL having exited out of the dichroic prism 154 to pass through the glass plate 21. Further, it is preferable that the glass plate 21 is substantially colorless and transparent.

The frame-shaped support 23 is provided around the thus configured movable section 22, and the movable section 22 and the support 23 are connected to each other via the shafts 241 and 242. The support 23 is formed to be thicker than the movable section 22, and the movable section 22 is supported in a position shifted toward the +Z-axis side by the support 23. The support 23 has recesses (cutouts) 231 and 232 formed therein, and the recesses 231 and 232 are open through (toward) the +Z-axis-side surface of the support 23 and extend in the X-axis direction. That is, the recesses 231 and 232 are concave relative to the +Z-axis-side surface of the support 23. The recesses 231 and 232 are disposed on opposite sides of the movable section 22 in a plan view. The recesses 231 and 232 may instead be open through (toward) the −Z-axis-side surface of the support 23. In other words, the recesses 231 and 232 may be concave relative to the −Z-axis-side surface of the support 23.

The shafts 241 and 242 are located in positions shifted from each other in the X-axis and Y-axis directions in a plan view and form the swing axis J of the movable section 22. The movable section 22 therefore swings (pivots) around the swing axis J, which is inclined by about 45° to two axes, the X and Y axes, and the attitude of the glass plate 21 changes in accordance with the swing motion. The inclination angle of the swing axis J with respect to the X axis (Y axis) is not limited to 45°.

The movable section 22, the support 23, and the shafts 241 and 242 described above are integrated with one another. Further, the movable section 22, the support 23, and the shafts 241 and 242 are made primarily of a resin.

The electromagnetic actuator 25 includes a permanent magnet 251, which is provided in the movable section 22, and a coil 252, which produces a magnetic field acting on the permanent magnet 251, as shown in FIGS. 4A and 4B. The permanent magnet 251 is disposed in a position shifted from the swing axis J and has an elongated shape along the Y-axis direction. The permanent magnet 251 is magnetized in the Z-axis direction (thickness direction of glass plate 21). The thus configured permanent magnet 51 is not limited to a specific type of magnet and can, for example, be a neodymium magnet, a ferrite magnet, a samarium-cobalt magnet, or an alnico magnet.

On the other hand, the coil 252 is held by a holding member 26 and fixed to the support 23 via the holding member 26. The coil 252 is disposed so as to face the movable section 22 and the permanent magnet 251 with an air gap therebetween. The arrangement allows the inner circumference of the coil 252 to be shorter than the contour of the permanent magnet 251, whereby power loss (due, for example, to heat generation) that occurs when current is applied to the coil 252 is suppressed. The coil 252 can thus more efficiently produce a magnetic field with a small amount of electric power.

Further, the coil 252 is an air-core coil. The movable section 22 is therefore allowed to more smoothly swing. In a specific description, for example, if a coil having a magnetic core disposed therein is used instead of the coil 252, the permanent magnet 251 is undesirably attracted to the magnetic core depending on the strength of the produced magnetic force. In this case, the swing axis J is displaced, undesirably resulting in unsmooth swing motion of the movable section 22 in some cases. On the other hand, using an air-core coil as the coil 252 as in the present embodiment avoids the problem described above and allows smooth swing motion of the movable section 22.

In the thus configured electromagnetic actuator 25, a drive signal (alternate voltage) from a voltage application section that is not shown is applied to the coil 252 to cause it to produce a magnetic field, and the produced magnetic field acts on the permanent magnet 251 to cause the movable section 22 to swing (pivot) around the swing axis J relative to the support 23, as shown in FIGS. 5A and 5B. The swing motion of the movable section 22 shifts the optical axis of the video light LL, and images are therefore displayed alternately in the image display positions P1 and P2 on the screen. The apparent number of pixels is thus increased, and the resolution of the images is increased.

The optical configuration of the projector 1 has been briefly described. The assembly of the portions described above will next be described in detail with reference to FIGS. 6 to 9.

In the projector 1, the electro-optical unit 15 and the projection lens 16 are held by a holding member 3, as shown in FIG. 6, and the holding member 3 allows the electro-optical unit 15 and the projection lens 16 to be fixed to each other and optically aligned with each other.

The holding member 3 has a first holding member 31, which holds the projection lens 16, a second holding member 32, which is held by the first holding member 31, and a third holding member 33, which is held by the second holding member 32 and holds the electro-optical unit 15.

The first holding member 31 includes a barrel holding section 311, which supports a fixing flange 162 provided around the outer circumference of a barrel 161 of the projection lens 16, and a holding section 312, which protrudes from an upper portion of the barrel holding section 311 toward the upstream side of the optical path.

The barrel holding section 311 of the first holding member 31 is formed in a roughly rectangular plate-like shape. An opening 311a having a circular hole is provided at the center of the barrel holding section 311, and the barrel 161 of the projection lens 16 is inserted through the opening 311a. The barrel 161 is inserted through the opening 311a and aligned, and the fixing flange 162 is fixed to the barrel holding section 311 with screws. The first holding member 31 can be formed, for example, of a synthesized resin member and is particularly formed of a member made of PPS (polyphenylene sulfide resin) to which glass fibers are added in the present embodiment.

The second holding member 32 is disposed at an upper portion of the first holding member 31, aligned with the first holding member 31, and fixed thereto with screws. The second holding member 32 can be formed of a metal member and is preferably formed of an SECC plate (electrically galvanized steel sheet) in the present embodiment.

The third holding member 33 is a member based on which the electro-optical unit 15 is aligned with the projection lens 16 and holds the electro-optical unit 15, as shown in FIG. 9. Specifically, the lower surface of the third holding member 33 is provided with a fixing section 331, and the upper surface of the dichroic prism 154 is fixed to the fixing section 331, for example, with an adhesive. The third holding member 33 is disposed below the second holding member 32 and fixed thereto with screws. The third holding member 33 can be formed of a synthesized resin member and is preferably formed of a member made of PC (polycarbonate resin) to which glass fibers are added in the present embodiment.

The light-exiting-side polarizers 153 and the liquid crystal panels 151, which correspond to the three color light fluxes, are disposed on three side surfaces (light incident surfaces 1541, 1542, and 1543) that are surfaces of the dichroic prism 154 and are adjacent to each other. That is, the light-exiting-side polarizer 153 and the liquid crystal panel 151R are disposed so as to face the first light incident surface 1541 of the dichroic prism 154, the light-exiting-side polarizer 153 and the liquid crystal panel 151G are disposed so as to face the second light incident surface 1542, and the light-exitingside polarizer 153 and the liquid crystal panel 151B are disposed so as to face the first light incident surface 1541, as described above.

A fixed substrate 4 is disposed on each of the three light incident surfaces 1541, 1542, and 1543 of the dichroic prism 154, and the light-exiting-side polarizers 153 are disposed on the fixed substrates 4. Further, a fixing frame 53 is fixed to each of the fixed substrate 4, and a holding frame 51, which holds the corresponding liquid crystal panel 151, is fixed to the fixing frame 53 via an adjustment frame 53. That is, the holding frame 51, the adjustment frame 52, and the fixing frame 53 form a holding section 5, which holds each of the liquid crystal panels 151.

In the configuration described above, the adjustment frames 52 allow alignment of the liquid crystal panels 151R, 151G, and 151B with one another. The adjustment frames 52 are fixed to the fixing frames 53, for example, with an adhesive after the alignment. Each of the adjustment frames 52 and the fixing frames 53 can be formed of a metal member, for example, an SPCC (cold rolled plywood) plate.

Fixing the electro-optical unit 15 and the projection lens 16 to each other as described above can reduce the amount of defocus of the video light LL. That is, the projection lens 16 has a temperature characteristic, and the focal length thereof changes with temperature. In view of the fact described above, in the projector 1, the total amount of expansion or shrinkage of the holding member 3 is caused to follow the amount of increase or decrease in the focal length of the projection lens 16 for a decrease in the amount of defocus.

The arrangement of the pixel shift device 2 and the electro-optical unit 15 will next be described in detail with reference to FIGS. 9 to 11.

The pixel shift device 2 is disposed between the projection lens 16 and the dichroic prism 154 and fixed to the first holding member 31 via a device holding member 6, as shown in FIG. 9. The method for fixing the pixel shift device 2 is not limited to the method described above. For example, the pixel shift device 2 may instead be fixed directly to the first holding member 31 via no device holding member 6.

The pixel shift device 2 is so disposed that the +Z side thereof (the side facing permanent magnet 251) faces the dichroic prism 154 and the −Z side thereof (the side facing coil 252) faces the projection lens 16, as shown in FIG. 10. The recesses 231 and 232, which are formed in the support 23, which supports the pixel shift device 2, as described above, allow reduction of the space where the pixel shift device 2 is disposed, whereby the pixel shift device 2 can be disposed in a relative small space between the dichroic prism 154 and the projection lens 16 with a spatial margin.

FIG. 10 is a plan view viewed along the optical axis of the video light LL. As shown in FIG. 10, the liquid crystal panel (first spatial light modulator) 151R and the liquid crystal panel (third spatial light modulator) 151B are disposed so as to face each other via the dichroic prism 154, and the pixel shift device 2 is disposed so that the glass plate 21 faces the light exiting surface 1544. The pixel shift device 2 is further disposed so as to be oriented vertically with respect to the dichroic prism 154. In other words, the pixel shift device 2 is disposed so that the glass plate 21 and the permanent magnet 251 are arranged vertically (in upward/downward direction). The electromagnetic actuator 25 (permanent magnet 251 and coil 252) of the pixel shift device 2 is disposed in a position outside the lower surface of the dichroic prism 154 (surface other than first light incident surface 1541 and third light incident surface 1543) and different from (not overlapping with) the positions of the liquid crystal panels 151R, 151G, and 151B. The arrangement of the electromagnetic actuator 25 in a position outside the dichroic prism 154 prevents the electromagnetic actuator 25 from blocking the video light LL, and the arrangement of the electromagnetic actuator 25 in a position different from those of the liquid crystal panels 151R, 151G, and 151B allows the pixel shift device 2 to be more precisely driven, whereby the projector 1 can show excellent image display characteristics.

Specifically, for example, if the pixel shift device 2 is disposed so as to be oriented horizontally with respect to the dichroic prism 154 and the electromagnetic actuator 25 would overlap with the holding section 5, the electromagnetic actuator 25 is undesirably too close to the liquid crystal panel 151R, as shown in FIG. 11. The liquid crystal panel 151R is held by the holding section 5, but the holding section 5 contains an SPCC plate material, which is a magnetic substance, as described above. The arrangement described above therefore tends to cause the magnetic field produced by the permanent magnet 251 to act on the holding section 5, and the permanent magnet 251 is attracted to the holding section 5 magnetized by the magnetic field, undesirably resulting in displacement of the swing axis J and a change in the attitude of the movable section 22 (glass plate 21). The undesirable effects prevent stable swing motion of the movable section 22 and increase power consumption, resulting in significant degradation in drive characteristics of the pixel shift device 2.

In contrast, the arrangement shown in FIG. 10 in the present embodiment allows the electromagnetic actuator 25 and the liquid crystal panel 151R (holding section 5) to be sufficiently separate from each other. The undesirable effects described above are therefore unlikely to occur, and degradation in drive characteristics of the pixel shift device 2 can be reduced. The projector 1 can therefore show excellent display characteristics. In particular, when a direction L1 in which the liquid crystal panel 151R and the liquid crystal panel 151B are arranged is caused to be roughly perpendicular to a direction L2 in which the glass plate 21 and the permanent magnet 251 are arranged, in other words, when the electromagnetic actuator 25 is disposed in a position rotated from the position of the liquid crystal panel 151R by 90° (=θ) around the center O of the dichroic prism 154, as in the present embodiment, the liquid crystal panel 151R and the electromagnetic actuator 25 can be separate from each other by a greater distance, whereby the advantageous effect described above can be more markedly provided. It is preferable to set θ at 90° as in the present embodiment, but the value of θ is not limited to 90°, and the advantageous effect described above can be sufficiently provided also by setting the value of θ as follows: $45° \leq θ \leq 135°$, and preferably $80° \leq θ \leq 100°$.

In the present embodiment, the electromagnetic actuator 25 is disposed in a position outside the lower surface of the dichroic prism 154. The arrangement further allows the electromagnetic actuator 25 to be more separate from the second holding member 32 and the screws that connect the first, second, and third holding members 31, 32, 33. Therefore, when the second holding member 32 and the screws have magnetism, the amount of the effect of the magnetic field from the permanent magnet 251 on the second holding member 32 and the screws can be reduced. The advantageous effect described above can therefore be more markedly provided.

The arrangement of the electromagnetic actuator 25 has been described above, but the arrangement of the electromagnetic actuator 25 is not limited to the arrangement described above as long as the electromagnetic actuator 25 is arranged in a position outside the dichroic prism 154 and different from (not overlapping with) the positions of the liquid crystal panels 151R, 151G, and 151B. For example, the electromagnetic actuator 25 may be arranged in a position outside the first light incident surface 1541 of the dichroic prism 154 and further outside the liquid crystal panel 151R (holding section 5). The electromagnetic actuator 25 may instead be arranged in a position outside the third light incident surface 1543 of the dichroic prism 154 and further outside the liquid crystal panel 151B (holding section 5). Either of the alternative arrangements described above can also allow the electromagnetic actuator 25 and the holding section 5 to be sufficiently separate from each other and provide the advantageous effect described above.

Second Embodiment

Figure 12:
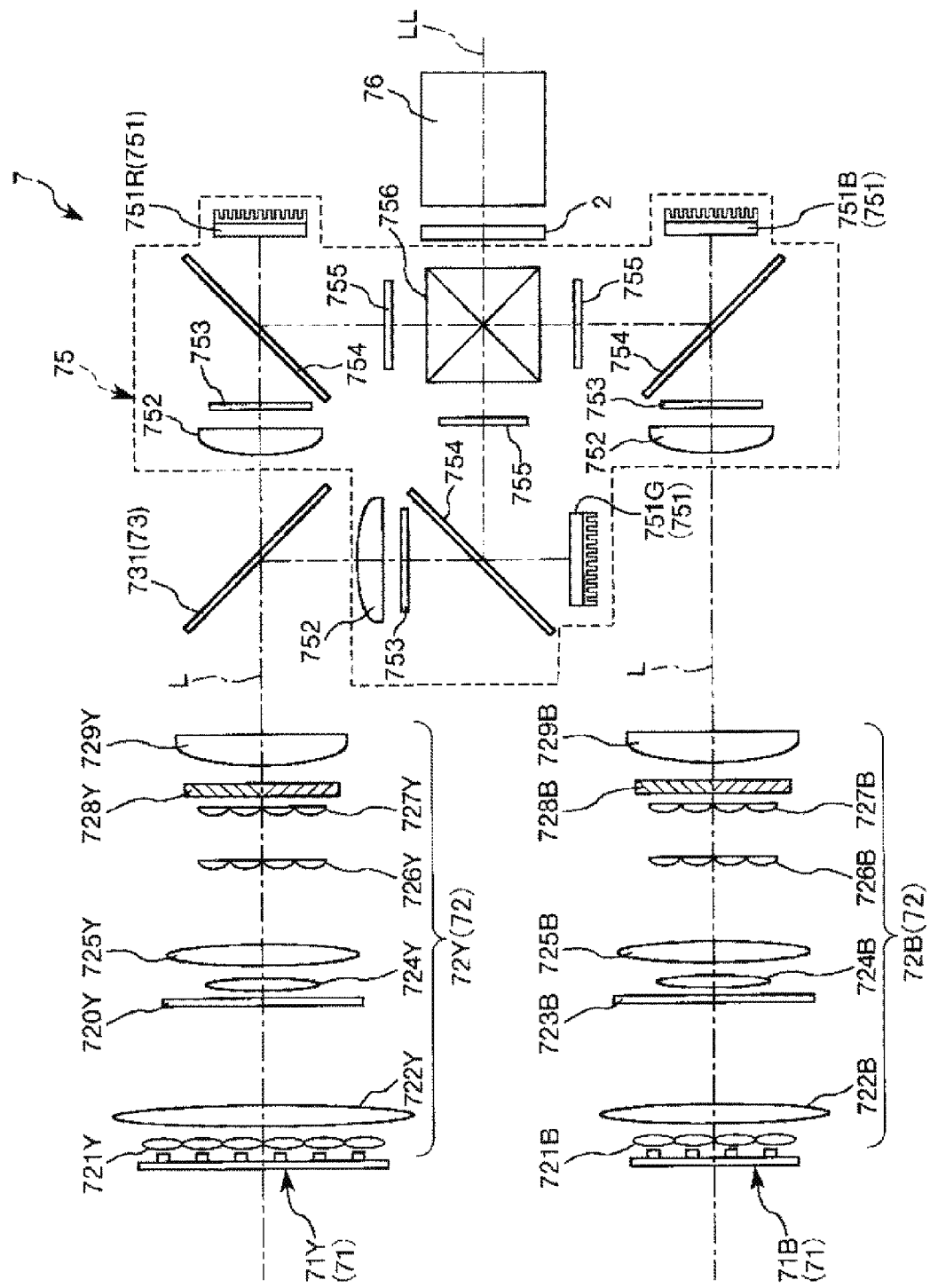
FIG. 12 shows the optical configuration of an image display apparatus according to a second embodiment of the invention.
Figure 13:
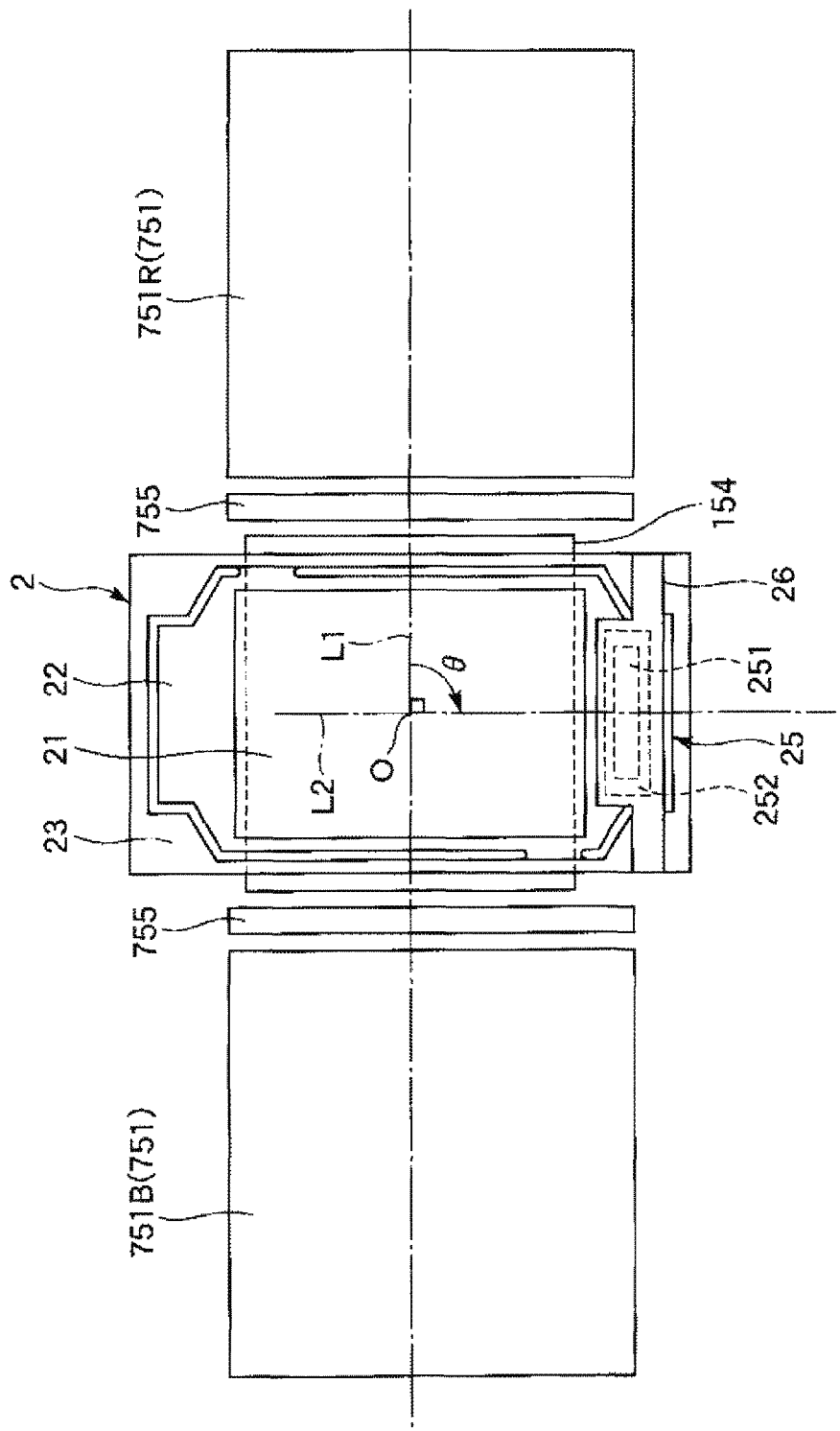
FIG. 13 is a plan view showing the positional relationship between an electro-optical unit and an optical path control unit of the image display apparatus shown in FIG. 12.

FIG. 12 shows the optical configuration of an image display apparatus according to a second embodiment of the invention. FIG. 13 is a plan view showing the positional relationship between an electro-optical unit and an optical path control unit of the image display apparatus shown in FIG. 12.

The image display apparatus according to the second embodiment of the invention will be described below. The description will be made primarily of points different from those in the embodiment described above and the same items as those in the embodiment described above will not be described.

The image display apparatus according to the second embodiment is the same as the image display apparatus according to the first embodiment described above except that the image display apparatus according to the second embodiment is an LCOS-based image display apparatus. The same configurations as those in the embodiment described above have the same reference characters.

A projector (image display apparatus) 7 according to the present embodiment is an LCOS-based projector and includes a light source unit 71, an illumination optical unit 72, a color separation optical unit 73, an electro-optical unit 75, a projection lens 76, and the pixel shift device 2, as shown in FIG. 12.

Light Source Unit

The light source unit 71 has a blue light illuminator 71B and a yellow light illuminator 71Y. The blue light illuminator 71B has blue laser diodes arranged in an array. The yellow light illuminator 71Y has excitation laser diodes arranged in an array. Each of the excitation laser diodes emits ultraviolet light or blue light as excitation light for exciting a phosphor.

Illumination Optical Unit

The illumination optical unit 72 has a blue light illumination optical unit 72B for the blue light illuminator 71B and a yellow light illumination optical unit 72Y for the blue light illuminator 71Y.

The blue light illumination optical unit 72B includes parallelizing lenses 721B, a collector lens 722B, a diffuser 723B, a pickup lens 724B, a parallelizing lens 725B, a first lens array 726B, a second lens array 727B, a polarization conversion element 728B, and a superimposing lens 729B, and the lenses and the other components optically process light having exited out of the blue light illuminator 71B.

The yellow light illumination optical unit 72Y includes parallelizing lenses 721Y, a collector lens 722Y, a phosphor substrate 720Y, a pickup lens 724Y, a parallelizing lens 725Y, a first lens array 726Y, a second lens array 727Y, a polarization conversion element 728Y, and a superimposing lens 729Y, and the lenses and the other components optically process light having exited out of the yellow light illuminator 71Y. The phosphor substrate 720Y is a substrate on which a phosphor layer that receives excitation light, such as ultraviolet light or blue light, and emits yellow light is formed.

Color Separation Optical Unit

The color separation optical unit 73 includes a dichroic mirror 731. The dichroic mirror 731 separates the yellow light outputted from the yellow light illumination optical unit 72Y into red (R) light and green (G) light.

Electro-Optical Unit

The electro-optical unit 75 includes reflective liquid crystal panels 751 (reflective liquid crystal panel 751R for R light, reflective liquid crystal panel 751G for G light, and reflective liquid crystal panel 751B for B light) as spatial light modulators, a dichroic prism 756, collector lenses 752, which are provided in correspondence with the reflective liquid crystal panels 751R, 751G, and 751B, apertures 753, polarizing beam splitters (polarization separation elements) 754, and polarizers 755.

In the configuration described above, the red light, the green light, and the blue light having passed through the polarizing beam splitters 754 are guided to the reflective liquid crystal panels 751R, 751G, and 751B, and color modulated light fluxes reflected off the reflective liquid crystal panels 751 are reflected off the polarizing beam splitters 754, pass through the polarizers 755, and are guided to the dichroic prism 756. The dichroic prism 756 then combines the modulated light fluxes to produce video light (combined light) LL and outputs the video light LL to the projection lens 76.

Although not shown, in the electro-optical unit 75, the dichroic prism 756 and the projection lens 76 are fixed to each other by the first holding member 31, the second holding member 32, and the third holding member 33 (or members corresponding thereto), and the reflective liquid crystal panels 751R, 751G, and 751B and other components are fixed to the dichroic prism 756 by the holding section 5 (or member corresponding thereto), as in the electro-optical unit 15 in the first embodiment described above.

Projection Lens

The projection lens 76 is configured as a lens unit that is a combination of a plurality of lenses, enlarges the video light LL produced by the electro-optical unit 75 at a desired magnification, and projects a color still image or color motion images on a screen.

Pixel Shift Device

The pixel shift device 2 is disposed between the dichroic prism 756 and the projection lens 76 and capable of shifting the optical axis of the video light LL having exited out of the dichroic prism 756. An image having resolution higher than the resolution of the reflective liquid crystal panels 751 can therefore be projected on the screen.

In the present embodiment, the electromagnetic actuator 25 (permanent magnet 251 and coil 252) of the pixel shift device 2 is also arranged in a position outside the lower surface of the dichroic prism 756 and different from (not overlapping with) the positions of the reflective liquid crystal panels 751R, 751G, and 751B, as shown in FIG. 13. The same advantageous effect as that provided by the first embodiment described above can therefore be provided.

The image display apparatus according to the embodiments of the invention have been described above with reference to the drawings, but the invention is not limited thereto. For example, in the image display apparatus according to any of the embodiments of the invention, the configuration of each of the portions can be replaced with an arbitrary configuration having the same function. Further, any other arbitrary configuration may be added to each of the embodiments of the invention.

In the embodiments described above, the description has been made of a liquid crystal projector as the image display apparatus, but the image display apparatus is not limited to a projector and can be used in a printer, a scanner, a head mounted display (HMD), a head-up display (HUD), and other apparatus.

The entire disclosure of Japanese Patent Application No. 2015-017658 filed Jan. 30, 2015 is expressly incorporated by reference herein.

What is claimed is:

1. An image display apparatus comprising:
a light source configured to emit light;
a first spatial light modulator and a second spatial light modulator configured to modulate the light emitted from the light source into first modulated light and second modulated light, respectively;
a dichroic prism configured to combine the first modulated light and the second modulated light into combined light and to output the combined light in an optical axis direction, the dichroic prism being in a cuboid shape, the dichroic prism having a first surface, a second surface opposite to the first surface, and a third surface interconnecting the first and second surfaces, the third surface being perpendicular to the optical axis direction; and
an optical path controller configured to change an optical path of the combined light output from the dichroic prism, the optical path controller having a transparent substrate on which the combined light is incident, an electromagnetic actuator displacing the transparent substrate, and an edge side, the electromagnetic actuator being disposed between the edge side and the transparent substrate,
wherein the third surface is in a rectangular shape and includes a first side, a second side parallel to the first side, a third side interconnecting the first and second sides, and a fourth side parallel to the third side,
the first surface and the third surface of the dichroic prism contacting each other on the first side, and the second surface and the third surface of the dichroic prism contacting each other on the second side,
the first spatial light modulator is disposed to face the first surface of the dichroic prism, and the second spatial light modulator is disposed to face the second surface of the dichroic prism, and
the optical path controller is disposed to face the third surface of the dichroic prism such that a surface of the transparent substrate faces the third surface and the electromagnetic actuator is located closer to the third side than the first and second sides.

2. The image display apparatus according to claim 1, wherein the electromagnetic actuator is located at a position rotated from a position of the first spatial light modulator around an optical axis of the combined light by an angle greater than or equal to 45° but smaller than or equal to 135° when viewed along the optical axis direction.

3. The image display apparatus according to claim 1, wherein the optical path controller includes:
an optical section;
a movable section that supports the optical section;
a shaft that pivotably supports the movable section around a swing axis; and
a support that supports the shaft, and
the electromagnetic actuator includes:
a permanent magnet provided in the movable section; and
a coil that is disposed so as to face the permanent magnet and the movable section and that produces a magnetic field acting on the permanent magnet.

4. The image display apparatus according to claim 3, wherein the support has a recess opening toward a surface facing the dichroic prism.

5. The image display apparatus according to claim 3, wherein the support has a recess opening toward a surface facing away from the dichroic prism.

6. The image display apparatus according to claim 1, further comprising a light modulator holding section that has magnetism and that holds the first spatial light modulator.

7. The image display apparatus according to claim 1, wherein the electromagnetic actuator is arranged outside the light combining element and in a position that is offset from the first spatial light modulator when viewed in the optical axis direction.

8. The image display apparatus according to claim 1, wherein the optical path controller is disposed such that the edge side is parallel to the third side.

9. The image display apparatus according to claim 8, further comprising:
a third spatial light modulator that modulates the light emitted from the light source,
wherein the dichroic prism has a fourth surface opposite to the third surface, and
the third spatial light modulator is disposed to face the fourth surface.

* * * * *